United States Patent
Brennan et al.

(10) Patent No.: US 6,968,391 B2
(45) Date of Patent: *Nov. 22, 2005

(54) SWITCH WITH COMPRESSED PACKET STORAGE

(75) Inventors: Walter Brennan, Sacramento, CA (US); Lawrence Lomelino, Folsom, CA (US); Jim Muth, Newport Beach, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/792,435

(22) Filed: Mar. 2, 2004

(65) Prior Publication Data

US 2004/0170185 A1 Sep. 2, 2004

Related U.S. Application Data

(63) Continuation of application No. 09/609,564, filed on Jun. 30, 2000, now Pat. No. 6,728,778.

(51) Int. Cl.[7] ............................................. G06F 13/00
(52) U.S. Cl. ...................... 709/238; 709/236; 709/247; 709/249; 370/401
(58) Field of Search ................................ 709/238, 247, 709/249, 250, 236; 370/401, 412, 419, 428

(56) References Cited

U.S. PATENT DOCUMENTS

| 5,553,063 | A |  | 9/1996 | Dickson |
| 5,758,256 | A |  | 5/1998 | Berry et al. |
| 5,991,305 | A |  | 11/1999 | Simmons et al. |
| 6,108,345 | A |  | 8/2000 | Zhang |
| 6,542,497 | B1 |  | 4/2003 | Curry et al. |
| 6,625,671 | B1 | * | 9/2003 | Collette et al. ................ 710/52 |
| 6,763,031 | B1 | * | 7/2004 | Gibson et al. .............. 370/428 |

* cited by examiner

*Primary Examiner*—Viet D. Vu
(74) *Attorney, Agent, or Firm*—Fish & Richardson P.C.

(57) ABSTRACT

A compressed switch data storage for a network system is disclosed. The system includes a plurality of network channels to transfer data, and devices coupled to the plurality of network channels. The devices provide or receive data. The system also includes a switch. The switch has a memory for storing compress data, and a plurality of ports coupled to the plurality of network channels. The switch routes data from one port to another port according to a destination port address.

17 Claims, 3 Drawing Sheets

SWITCH WITH COMPRESSED PACKET STORAGE

CLAIM OF PRIORITY

This application is a continuation application and claims priority under 35 USC §120 to U.S. patent application Ser. No. 09/609,564, filed Jun. 30, 2000 now U.S. Pat. No. 6,728,778, and entitled "LAN SWITCH WITH COMPRESSED PACKET STORAGE", the contents of which is incorporated by reference.

BACKGROUND

The present disclosure generally relates to network switching and more specifically, to compressed data storage in network switching.

Networking allows computers to share resources, access information, communicate via e-mail, share data, and transfer files. However, networking technology and digital data transmission have been subject to a number of bandwidth and speed limitations due to a growing population of network users. Other factors that contribute to congestion include faster CPUs, faster operating systems, and more network-intensive applications.

Switching alleviates congestion in networks such as the Local Area Network (LAN) by reducing traffic and increasing bandwidth. The term switching refers to a technology in which a device, referred to as a switch, connects two or more network segments. A switch receives a packet of data from one segment, examines the embedded address information, and transmits the data packet to designated destinations on other segments.

The received data packet is often stored for a short period of time before being forwarded to the destination. The storage area is referred to as a packet buffer or packet data memory.

BRIEF DESCRIPTION OF THE DRAWINGS

Different aspects of the disclosure will be described in reference to the accompanying drawings wherein.

DETAILED DESCRIPTION

A Local Area Network (LAN) system often provides information exchange over shorter distances than a Wide Area Network (WAN) system. A LAN system may operate at higher speeds than the WAN system. Furthermore, hardware used in LAN systems is generally discrete, controlled, and homogeneous, which provides an advantageous environment for high-speed operation. Therefore, data packets in a LAN system are transmitted in an uncompressed format.

Accordingly, packets are stored in the buffer area in an uncompressed format. However, the memory buffer may need to be relatively large in size to store the uncompressed data packets.

Figure 1:
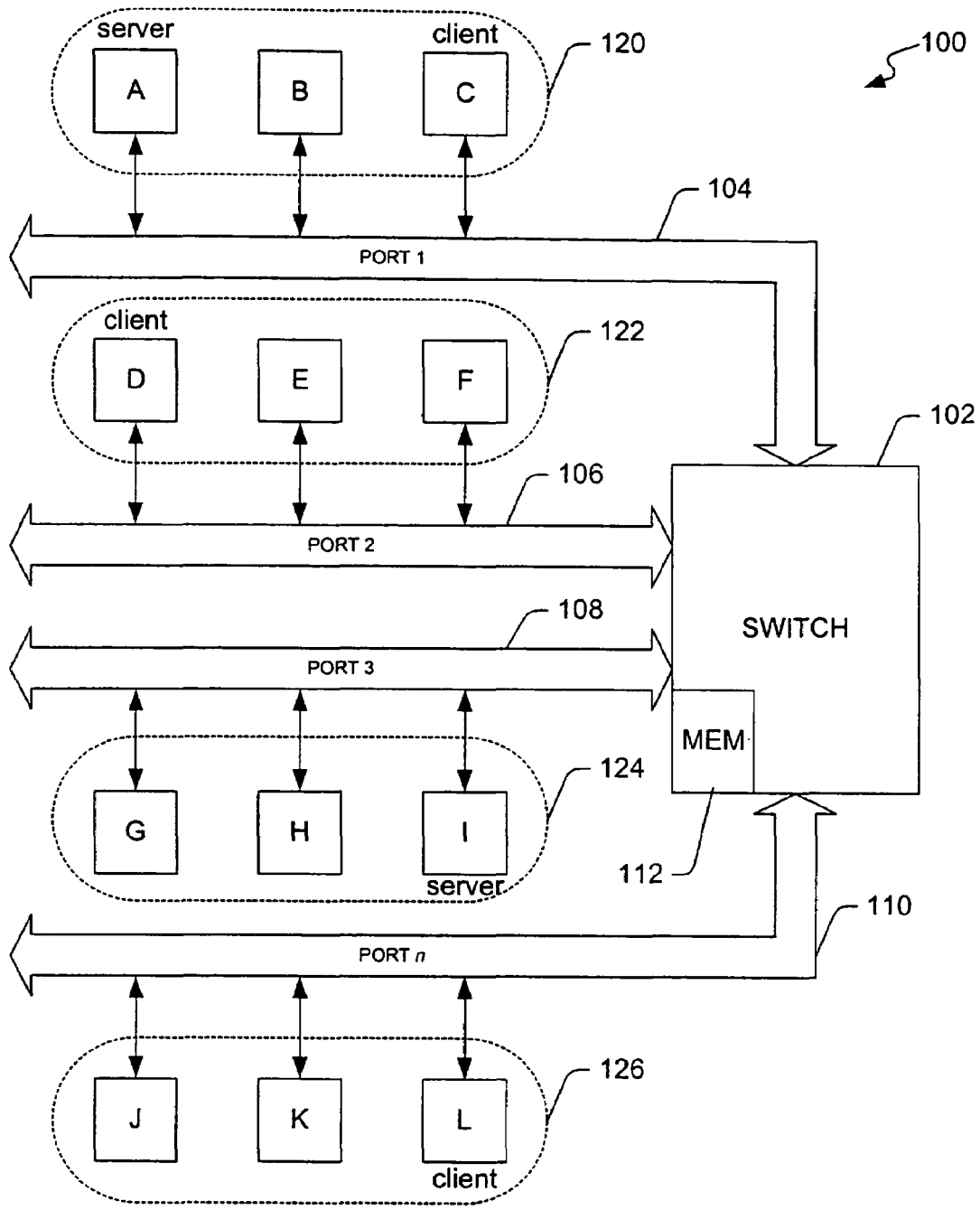
FIG. 1 illustrates a network system such as the LAN system in accordance with an embodiment.

FIG. 1 illustrates a network system such as the LAN system 100 in accordance with an embodiment. In the illustrated embodiment, the LAN system 100 includes a switch chip 102, a plurality of devices A through L, and a plurality of ports 104–110. The switch 102 includes memory 112 that may store the data packets in a compressed format. Compressing the data packets may reduce the amount of memory required for the packet buffer. The smaller memory size may enable the memory 112 to be embedded into the same die as the switch chip 102.

Each device on the LAN system 100 has a media access control (MAC) address, which uniquely identifies the device to the network. The device may be a computer, processor, printer or other peripherals capable of storing and exchanging information. The device may serve as a client or a server. The term "client" refers to a device's general role as a requester of data or services, and the term "server" refers to a device's role as a provider of data or services. The size of a computer, in terms of its storage capacity and processing capability, does not necessarily affect its ability to act as a client or server. Further, it is possible that a device may request data or services in one transaction and provide data or services in another transaction, thus changing its role from client to server or vice versa.

The data packets are delivered, and origination devices are recognized by MAC addresses on the packets. The switch 102, and each port 104–110 on the switch 102, supports a finite number of MAC addresses. However, the overall number of addresses for the switch 102 may be large, so that the switch 102 can support a large number of devices. In the illustrated embodiment of FIG. 1, the number of ports (n) may be large.

In FIG. 1, each LAN segment 120–126 is connected to a port 104–110 on the LAN switch chip 102. If server A on port #1 104 needs to transmit to client D on port #2 106, the LAN switch chip 102 forwards data packets from port #1 104 to port #2 106. Ports #3 108 through #n 110 may be isolated from the data traffic between port #1 and port #2.

If server I needs to send data to client L at the same time that server A sends data to client D, the server I may do so because the LAN switch chip 102 can forward data packets from port #3 108 to port #n 110 at the same time it is forwarding data packets from port #1 104 to port #2 106. If server A on port #1 104 needs to send data to client C, which is also on port #1 104, the LAN switch chip 102 does not need to forward any packets. Thus, the switch chip 102 alleviates data traffic congestion on the LAN system. The switch chip 102 may also increase the bandwidth by simultaneously routing data between more than one pair of switch chip ports.

In some embodiments, the switch chip 102 may transfer compressed data packets internally. In other embodiments, the switch chip 102 may transfer compressed data packets along an extended system backplane before decompression and transmission to the destination port.

The memory 112 in the switch chip 102 is configurable to store the packet data in a specified configuration.

Figure 2A:
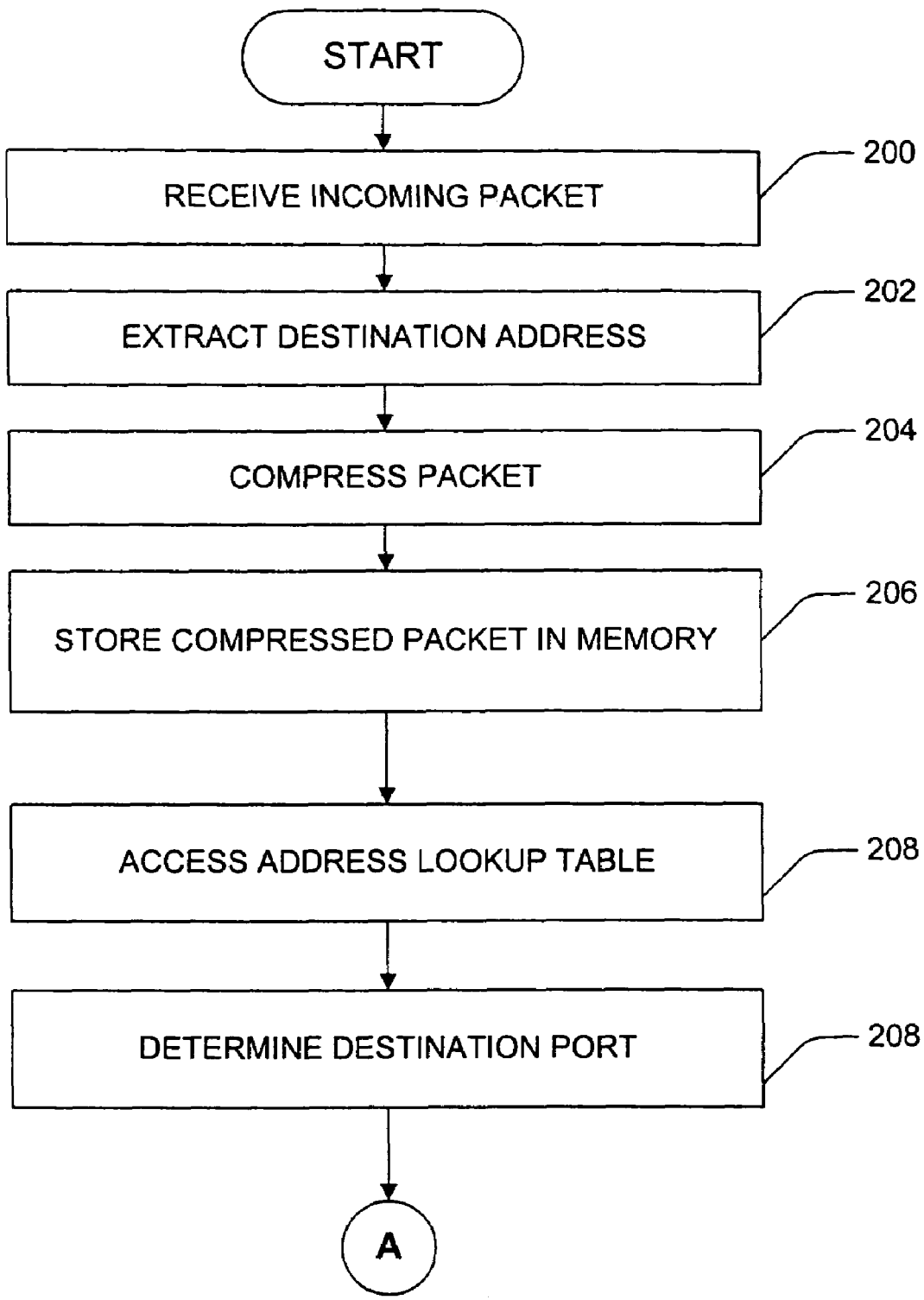
FIGS. 2A and 2B show a flowchart of a LAN switching process in accordance with an embodiment.
Figure 2B:
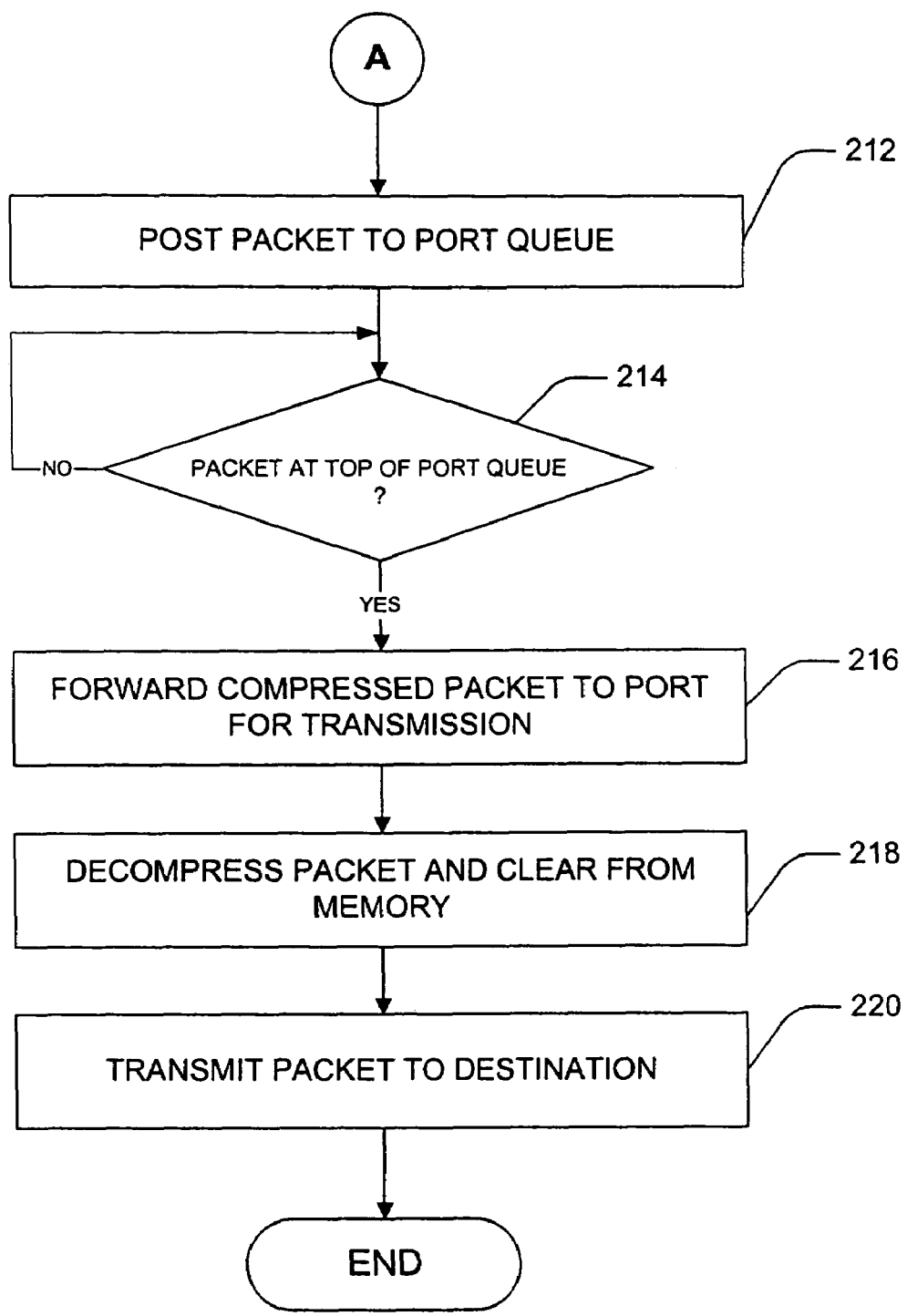

A flowchart of a LAN switching process in accordance with an embodiment is illustrated in FIGS. 2A and 2B. An incoming packet of data is received at 200. At 202, a destination MAC address may be extracted from the packet. The data packet is compressed at 204. The compressed data packet is stored in a packet memory at 206.

A lookup table in the memory is accessed at 208. The lookup table provides port addresses corresponding to the MAC addresses of the devices. A lookup engine searches the table to determine the switch port corresponding to the destination MAC address at 210.

Once the corresponding port is identified, the packet is posted to the appropriate queue at 212. When the packet rises to the top of the queue at 214, the packet may be forwarded to the output port at 216. The packet may then be decompressed for transmission at 218 and cleared from memory. The decompressed data packet is transmitted to the destination address via the port address from the lookup table at 220.

The advantages of providing a LAN switch chip with a built-in memory having compressed packet data include low cost and decreased chip count. By storing the packet data in the switch chip, a need for external memory devices is reduced or eliminated. Further, the consolidation reduces the chip manufacturer's dependence on third party memory suppliers.

While specific embodiments of the invention have been illustrated and described, other embodiments and variations are possible. For example, although the switch configuration has been described in terms of an integrated switch chip with embedded memory, the system may be implemented with separate chips for switching fabric, memory and physical layer port interfaces.

All these are intended to be encompassed by the following claims.

What is claimed is:

1. A switch chip, comprising:
    multiple ports to connect to segments of a local area network (LAN);
    memory embedded within the switch chip; and
    circuitry integrated within the switch chip, the circuitry to:
        access a packet received via one of the multiple ports, the packet including a media access control (MAC) destination address;
        compress packet data of the received packet;
        store the compressed packet data in the memory embedded within the switch chip;
        perform a lookup for the MAC destination address of the received packet using a table storing compressed MAC addresses stored in the memory embedded within the switch chip to identify at least one of the multiple ports as at least one egress port for the received packet, the table associating MAC addresses with the multiple ports;
        decompress the compressed packet data stored in the embedded memory; and
        transmit the decompressed packet data via the at least one egress port.

2. The switch chip of claim 1,
    wherein the circuitry further comprises circuitry to add an entry for the received packet in at least one queue associated with the at least one egress port.

3. The switch chip of claim 1,
    wherein the circuitry to decompress comprises circuitry to decompress the packet data after the entry for the received packet reaches the top of the at least one queue.

4. The switch chip of claim 1,
    wherein the circuitry comprises circuitry to compress the MAC destination address of the received packet and add the compressed MAC destination address to the table.

5. The switch chip of claim 1,
    wherein the circuitry to compress the packet data comprises circuitry to compress the packet.

6. The switch chip of claim 1,
    wherein the circuitry does not access memory external to the switch chip.

7. A method comprising, comprising;
    receiving a packet from a local area network (LAN) segment at one of multiple ports provided by a switch chip including an embedded memory, the packet including a media access control (MAC) destination address;
    compressing packet data of the received packet and a MAC destination address of the received packet;
    storing the compressed packet data in the memory embedded within the switch chip;
    adding the compressed MAC destination address to a table stored in the memory embedded within the switch chip;
    performing a lookup for the MAC destination address of the received packet using the table to identify at least one of the multiple ports as at least one egress port for the received packet, the table associating MAC addresses with the multiple ports;
    decompressing the compressed packet data stored in the embedded memory; and
    transmitting the decompressed packet data via the at least one egress ports.

8. The method of claim 7,
    further comprising adding an entry for the received packet in at least one queue associated with the at least one egress port.

9. The method of claim 7,
    further comprising decompressing the packet data after the entry added for the received packet reaches the top of the at least one queue.

10. The method of claim 7,
    wherein the table comprises a table storing compressed MAC addresses.

11. The method of claim 7,
    wherein compressing the packet data comprises compressing the packet.

12. A method comprising, comprising:
    receiving a packet from a local area network (LAN) segment at one of multiple ports provided by a switch chip including an embedded memory, the packet including a media access control (MAC) destination address;
    compressing packet data of the received packet, wherein compressing the packet data comprises compressing the packet;
    storing the compressed packet data in the memory embedded within the switch chip;
    performing a lookup for the MAC destination address of the received packet using a table stored in the memory embedded within the switch chip to identify at least one of the multiple ports as at least one egress port for the received packet, the table associating MAC addresses with the multiple ports;
    decompressing the compressed packet data stored in the embedded memory; and
    transmitting the decompressed packet data via the at least one egress ports.

13. The method of claim 12,
    further comprising adding an entry for the received packet in at least one queue associated with the at least one egress port.

14. The method of claim 12,
further comprising decompressing the packet data after the entry added for the received packet reaches the top of the at least one queue.

15. The method of claim 12 further comprising,
compressing the MAC destination address of the received packet.

16. The method of claim 15 further comprising,
adding the compressed MAC destination address to the table.

17. The method of claim 12,
wherein the table comprises a table storing compressed MAC addresses.

* * * * *